Oct. 29, 1968   E. R. KEBBON   3,407,427
WINDSHIELD WIPER MECHANISM
Filed March 1, 1966   2 Sheets-Sheet 1
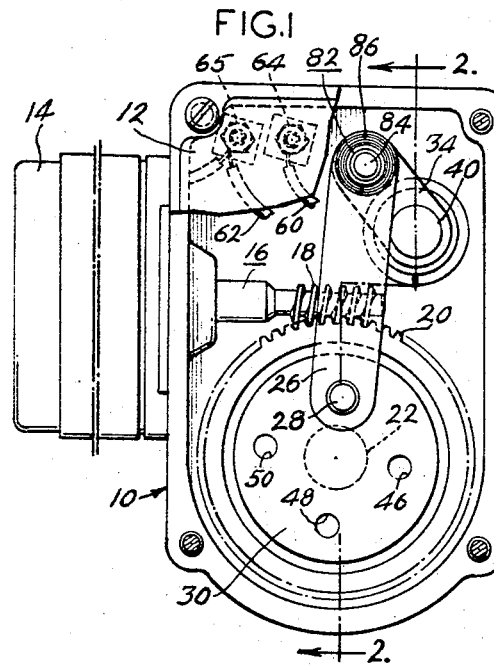
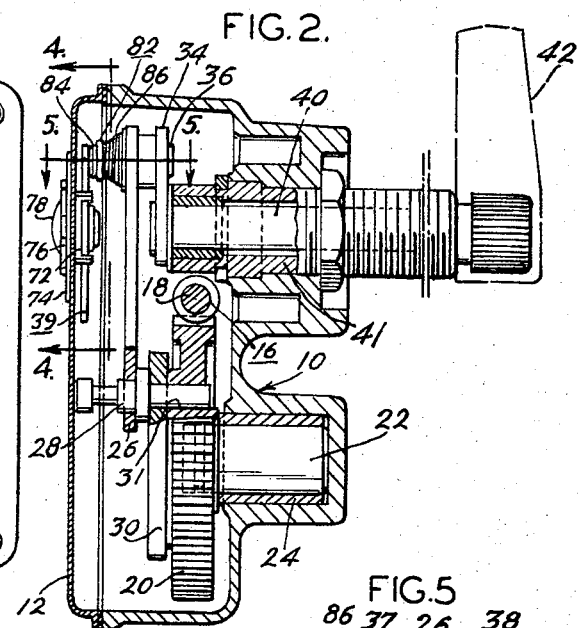
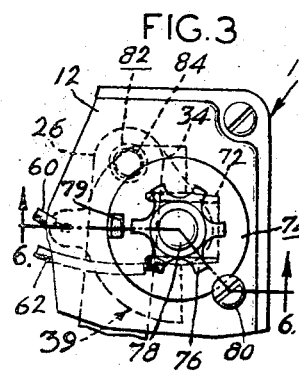
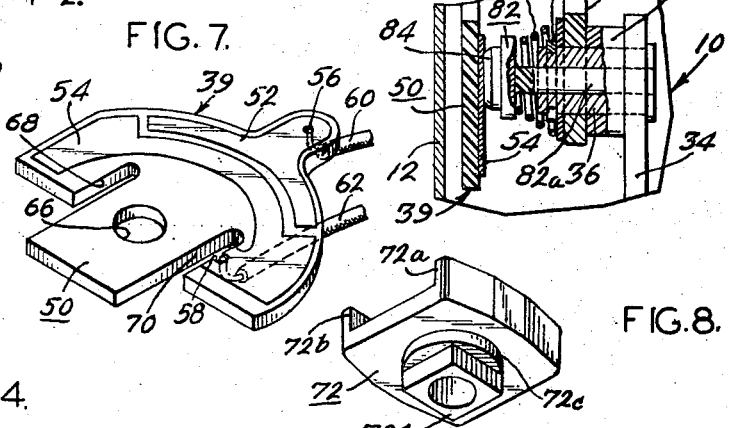
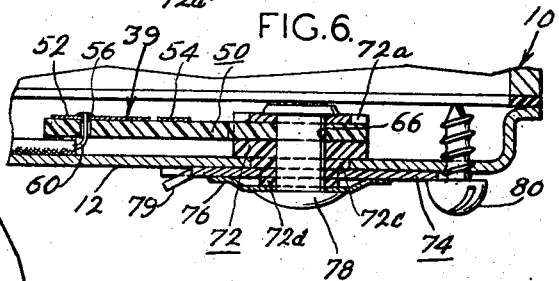
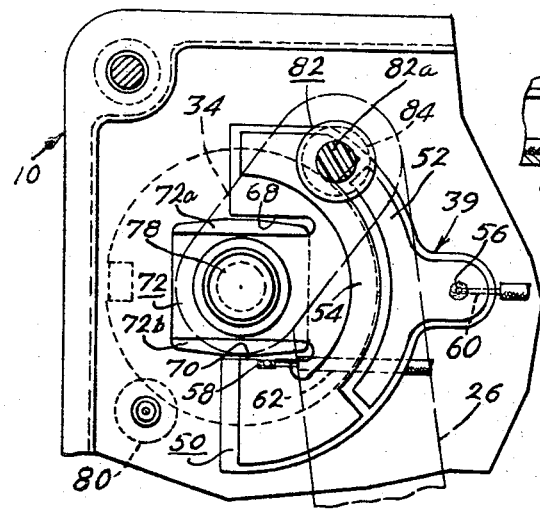
INVENTOR:
EARL R. KEBBON
BY Howson & Howson
ATTYS.

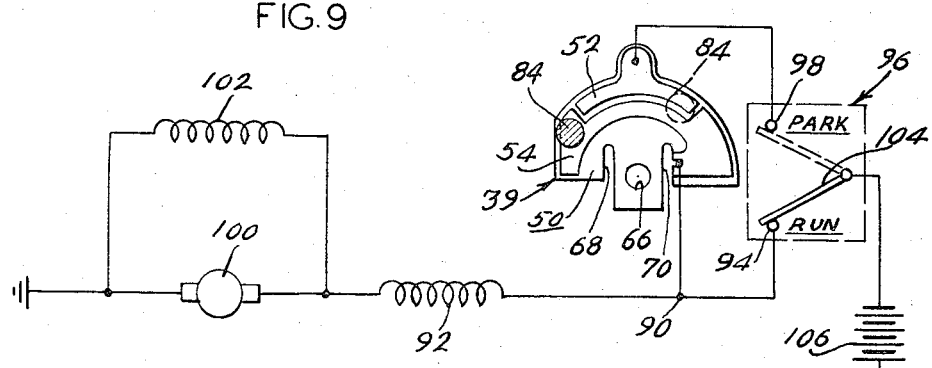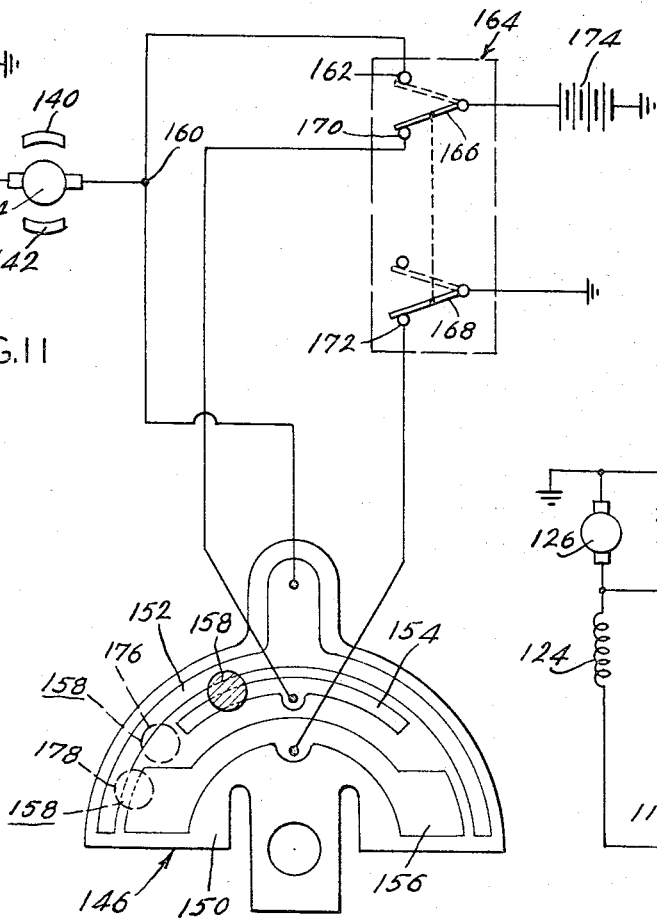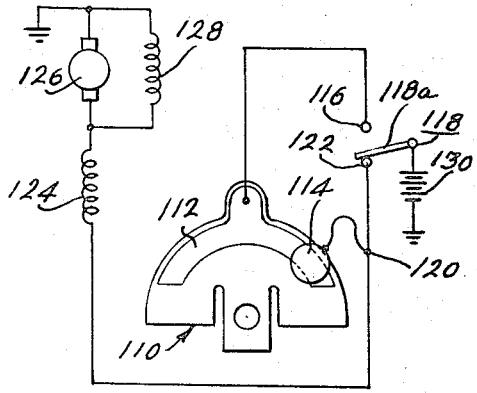

United States Patent Office 3,407,427
Patented Oct. 29, 1968

3,407,427
WINDSHIELD WIPER MECHANISM
Earl R. Kebbon, Columbus, Miss., assignor to American Bosch Arma Corporation, Garden City, N.Y., a corporation of New York
Filed Mar. 1, 1966, Ser. No. 530,824
17 Claims. (Cl. 15—250.17)

ABSTRACT OF THE DISCLOSURE

A windshield wiper mechanism is provided having an electric motor, and drive means coupled to the motor and adapted to drive a windshield wiper back and forth through an arc, the drive means including an actuator member movable in a predetermined path. A parking switch is provided which includes a printed circuit board having a printed circuit thereon. The printed circuit includes at least one conductive segment, and a conductive member is connected to the actuator member and adapted to move with the actuator member in contact with the conductive segment over a portion of the path of the actuator member to complete a circuit between the conductive segment and the conductive member. Manual switch means is employed for connecting the motor alternatively directly to a source of power or to the source of power through the circuit between the conductive segment and conductive member so that when the conductive member moves free of the conductive segment the motor will be deenergized.

---

The present invention relates to a windshield wiper mechanism and, more specifically, to an improved parking switch for a windshield wiper mechanism having an automatic parking feature.

In a pending application entitled "Windshield Wiper Mechanism," of James W. Smith, Ser. No. 244,217, filed Dec. 12, 1962, of common assignee herewith, there is described a windshield wiper mechanism having various components which function similarly to certain components in the present invention. The present invention involves an improved parking switch which may be used to achieve the automatic parking feature, wherein the windshield wiper is stopped at a predetermined position of its travel.

In prior art windshield wiper mechanisms, a variety of parking switches have been employed to provide the automatic parking feature. Such parking switches for the most part have been made with movable arms which are preformed or stamped and which must be assembled into a parking switch unit. Accordingly, it is an object of the present invention to provide a greatly simplified parking switch which is easily and inexpensively manufactured without requiring the assembly of individual contact elements.

Another object of the present invention is to provide a parking switch which is rugged in design and reliable in operation for a long operable life.

It is also an object to provide a new and improved parking switch which eliminates contacts on switch arms and the like.

Still a further object is to provide a new and improved parking switch including a circuit to facilitate dynamic braking of the windshield wiper motor to prevent the armature of the motor from coasting after the wiper arm has reached the desired parking position.

In accordance with the present invention, these and other objectives are achieved by providing a new and improved parking switch with novel features which cooperate to accomplish the above objectives. According to the present invention, a printed circuit board is employed having a printed circuit thereon. The printed circuit board with the circuit may be made by any of the conventional printed circuit processes. In the preferred embodiment of the parking switch, the printed circuit includes a first conductive segment and a second conductive segment spaced from the first conductive segment. An actuator member is provided which is movable in a predetermined path. A conductive member is employed connected to the actuator member and adapted to move with the actuator member in contact with each of the conductive segments over a portion of the path of the actuator member to complete a circuit between the conductive segments. The circuit of the parking switch is connectable as a part of a circuit for a motor, which drives a windshield wiper through drive means, the motor being energized by a suitable source of power. When the motor is connected to the source of power through the circuit of the parking switch and the conductive member moves free of one of the conductive segments, the circuit connecting the motor to the source of power will be interrupted, thereby deenergizing the motor. The windshield wiper may be parked at either extreme of its travel by having the conductive member move free of one of the conductive segments at the desired extreme of travel of the windshield wiper. The actuator member of the windshield wiper mechanism is part of the drive means may be connected to, any for example any actuating link or crank which is used to translate the rotation of the motor to the oscillatory movement of the windshield wiper.

In accordance with a further feature of the present invention, a novel and convenient means is provided for dynamically braking the rotating armature of the motor for accurately parking the wiper at a desired position. In order to achieve the desired result, the motor includes an armature which rotates in a magnetic field provided by permanent magnets. The printed circuit of the parking switch is provided with a third conductive segment spaced from the first and second conductive segments. The third conductive segment is arranged to be contacted by the conductive member when the conductive member has moved free of the second conductive segment, for example, so that another circuit is completed by the conductive member between the first and third conductive segments. The circuit between the first and third conductive segments is employed to connect the armature of the motor to electrical ground when the windshield wiper mechanism is to be parked, thereby providing dynamic braking of the armature rotating within the magnetic field for accurate parking of the windshield wiper at a desired position.

For a better understanding of these and other features and advantages of the present invention, reference is made to the following description and accompanying drawings, in which:

FIG. 1 is an elevational view from the back of the windshield wiper mechanism with the drive motor foreshortened and with part of the casing containing the mechanism broken away;

FIG. 2 is a sectional view taken along line 2—2 of FIG. 1;

FIG. 3 is a fragmentary elevational view from the back of the windshield wiper mechanism showing the adjustment means for varying the position of the parking switch;

FIG. 4 is an enlarged fragmentary sectional view taken along line 4—4 of FIG. 2;

FIG. 5 is an enlarged fragmentary sectional view taken along line 5—5 of FIG. 2;

FIG. 6 is an enlarged fragmentary sectional view taken along line 6—6 of FIG. 3;

FIG. 7 is an enlarged perspective view of the printed circuit board of FIG. 1 in accordance with the preferred form of the present invention;

FIG. 8 is an enlarged perspective view of the bearing member of FIG. 6 used in positioning the printed circuit board with respect to the casing;

FIG. 9 is a schematic circuit diagram showing a preferred circuit for the drive motor of the present invention;

FIG. 10 is a schematic circuit diagram showing an alternative form of the circuit for the drive motor; and FIG. 11 is a schematic circuit diagram of still another form of the circuit for the drive motor.

Referring to FIGS. 1 and 2, it will be seen that the mechanism is housed in a casing generally designated 10 which may be molded or cast in any known appropriate manner. One side of the casing is closed by a sheet metal cover 12 fastened to the casing 10 by screws or other suitable connection means. A suitable drive motor 14, ordinarily a direct current motor, is provided.

As is conventional of systems of this type, the motor shaft 16 is provided with a helical worm 18 which meshes with and drives a larger rotatable worm gear 20, here supported on an integral shaft 22 suitably journalled in a bearing 24 within a preformed portion of the housing 10. The rotatable gear 20 drives an actuating link 26 through a suitable pivot stud 28 having an axis spaced from but parallel to the axis of the rotatable gear. In the present instance, a face plate 30 is attached to rotatable gear 20 and pivot stud 28 extends into an aligned opening generally designated 31 through the plate and rotatable gear. Pivot stud 28 has an increased diameter portion between face plate 30 and actuating link 26 and extends from the increased diameter portion through the actuating link to adjacent but out of contact with sheet metal cover 12. In assembly, the pivot stud is inserted through the aligned opening in the face plate and rotatable gear with the actuating link then being inserted over the stud. The stud loosely fits within the opening in the plate and gear and is retained in this position by having its longitudinal movement away from the face plate limited by sheet metal cover 12.

Actuating link 26 is connected at its remote end to a crank arm 34 by means of a suitable pin or pivot connection 36. In the present instance, pin 36 is a tubular rivet having an outwardly extending radial flange at one end and having a groove adjacent its other end for receiving a retaining ring 37, as shown in FIG. 5. A spacer sleeve 38 encircles the portion of the pin 36 between the link and crank arm. The pivotal connection serves as an actuator for operating a parking switch generally designated 39, to be explained hereinafter.

Crank arm 34 is fastened to rotate with shaft 40 which is suitably journalled in bearings in a conventional sleeve 41 provided in an extension of the housing for this purpose. A conventional wiper blade assembly 42 is connected to the end of shaft 40. The geometry of this arrangement is such that as the motor drives rotatable worm gear 20 through worm 18, actuating link 26 will be moved reciprocally by stud 28 to cause crank arm 34 to oscillate back and forth through an arc of predetermined angular size. This action preferably produces full oscillation of the windshield wiper blade once each revolution of the rotatable gear 20.

In the mechanism of the present invention, there is provided means for changing the arc of oscillation and the position at which the pivotal connection 36 facilitates parking of the windshield wiper. As previously stated, stud 28 is slidably retained in opening 31 through rotatable gear 20 and face plate 30. The stud is adjustable to different angular positions by movement of the stud to one of the other aligned openings 46, 48 or 50 through the face plate and rotatable gear. Openings 31, 46, 48 and 50 are spaced from one another at different locations through the face plate and gear and at different radial distances from the axis of rotation of the rotatable gear. The pivot stud 28 is adjusted to a new position by loosening the screws holding the sheet metal cover 12 to the housing, lifting the sheet metal cover in order to move stud 28 from opening 31, loosening retaining ring 37, and moving the stud to a new aligned opening through the face plate and rotatable gear. For example, the circle of rotation of the end of actuating link 26 adjacent face plate 30 is made larger when stud 28 is removed from opening 31 and inserted through opening 50, thus making larger the arc of oscillation of the windshield wiper.

The detailed mechanical structure of parking switch 39 may be seen in FIGS. 2 through 7. The parking switch comprises an insulating board 50 having a printed circuit of conductive metal segments 52 and 54, such as copper, printed, plated, etched or pressure bonded thereon in a conventional manner. The insulating board may be made of a phenolic resinous material, fiberglass or other suitable non-conductive material. The geometric configuration of the conductive segments in the present preferred embodiment of the invention are generally arcuate in form with conductive segments 54 being spaced from and parallel to conductive segments 52 over the length of conductive segment 52, conductive segment 54 being of greater length than conductive segment 52. Apertures 56 and 58 are provided through the insulating board 50 at points through conductive segments 52 and 54, respectively, for insertion of electrical leads 60 and 62 through the respective apertures for electrical connection to conductive segments 52 and 54, respectively. Conductive leads 60 and 62, as shown in FIG. 1, are connected to terminals 64 and 65, respectively, on and insulated from casing 10, the terminals being connected in the motor circuit to be described hereinafter.

The means for supporting the printed circuit board 50 relative to cover 11 is seen most clearly in FIGS. 3, 4, 6 and 8. The printed circuit board 50, which is generally semi-circular in form, has a hole 66 located approximately at the radial center for the arcs scribed by the conductive segments and has two parallel slots 68 and 70 on opposite sides and spaced from hole 66. Slots 68 and 70 are adapted to receive parallel extending ears 72a and 72b of insulating bearing member 72 preferably made of nylon. Bearing member 72 has a central opening which is adapted to be aligned with opening 66 when ears 72a and 72b of the bearing are fitted within slots 68 and 70 in the insulating board. The bearing member is provided with a circular reduced cross-section shoulder 72c extending the opposite direction from the ears. The reduced diameter shoulder is snugly fitted within an opening in sheet metal cover 12 from the inside surface thereof. There is provided a further reduced cross-section portion 72d of bearing member 72 which is square in section extending from shoulder 72c. A washer 74 is provided having a square opening which is adapted to snugly receive square cross-section portion 72d of bearing member 72 from the outside surface of cover 12. A spring washer 76 is positioned at the end of portion 72d of the bearing member and the assembly of the insulating board 50, bearing member 72, washer 74 and spring washer 76 are held together by a rivet 78, as shown in FIG. 6. Washer 74 has an upturned tab 79 along its periphery providing a rotational adjustment of the printed circuit board. The tab is adapted to be engaged for turning the bearing member and printed circuit board relative to cover 12 and pivotal connection 36. Washer 74 may be fixed in position by a sheet metal screw 80 threaded into cover 12 and engaging the periphery of washer 74, as shown in FIGS. 3 and 6.

The parking switch circuit on printed circuit board 50 is completed by a conductive member supported at pivotal connection 36 as shown in FIGS. 2, 4 and 5. More specifically, an insulating brush holder 82 of nylon having a shank 82a is inserted in the opening of tubular pin 36. A brush 84 preferably of carbon-copper mixture is fixed to the head of the brush holder adjacent insulating board 50. Brush holder 82 holds brush 84 against printed circuit board by being biased by helical spring 86 located between the head of the brush and the pivotal connection. As seen in FIG. 5, brush 84 is biased to a position against the insulating board to be in sliding contact with the bridge across conductive segments 52 and 54 of the printed circuit. It should be noted, as shown in FIG. 4, that the arcuate pattern of the conductive segments corresponds to the general arcuate path of movement of the brush and pivotal connection as the crank arm is moved by the actuating link. As previously stated, generally arcuate conductive segment 52 is shorter in length than generally arcuate conductive segment 54. The arcuate path of travel of the brush is greater than the peripheral length of conductive segment 52 so that the brush bridges conductive segments 52 and 54 only during a portion of the path of travel of the brush. In this arrangement, the brush is adapted to move free of conductive segment 52 at one or the other of the extremes of travel of the brush so that the circuit completed by the brush between conductive segments 52 and 54 is interrupted once each oscillation of the windshield wiper blade at one extreme of its travel. Of course, the relative position of the printed circuit board can be adjusted so that the brush moves free of conductive segment 52 at either extreme of travel of the brush to park the windshield wiper at either extreme of its travel.

The preferred circuit for the system and operation of the system is seen in FIG. 9. In this circuit, the parking switch 39, represented schematically by conductive segments 52 and 54 on insulating board 50 and brush 84, is shown with conductive segment 54 connected to junction point 90 between series winding 92 and one contact 94 of single pole, double throw switch 96. Conductive segment 52 is connected to second contact 98 of single pole double throw switch 96. The motor used to drive the windshield wiper mechanism is shown as a compound wound direct current motor having series winding 92 and an armature 100 connected in parallel with winding 102. Pole 104 of switch 96 is electrically connected to a source of power 106. The circuit arrangement is such that when pole 104 of manual switch 96 is in the run position connected to contact 94, the motor will be energized through the direct connection to the power source 106. In this position of the manual switch, the parking switch plays no part in the operation and the motor operates continuously as a compound wound direct current motor. However, when the manual switch 96 is turned to its "park" position, in which pole 104 engaged contact 98, the motor is connected through the parking switch and manual switch to the source of power. If when the manual switch is placed in the "park" position, as shown in the alternative position of pole 104 in FIG. 9, while a brush 84 is bridged across conductive segments 52 and 54, a circuit is completed from the power source to the motor through the parking switch and the motor will continue to run until such time as brush 84 has moved free of conductive segment 52, as shown by the alternative position of the brush in FIG. 9. With the brush free of conductive segment 52 as shown in the alternative position of the brush in FIG. 9, the circuit to the motor will be interrupted so that the wiper will be parked.

As previously stated, the position of the printed circuit board may be changed relative to the brush by movement of tab 79 of washer 74 rotating the bearing member and printed circuit board to a new position relative to the path of travel of the brush. In this manner, the circuit of the parking switch may be changed to have the brush move free of conductive segment 52 at the other extremity of travel of the brush so that the wiper will park at the opposite extremity of its travel. The adjustment may be made by simply loosening screw 80 and moving the tab 79 on washer 74 to rotate the switch assembly, thus changing the relationship between the brush and printed circuit board. In this manner, fine adjustment of the park position of the wiper can be made. It should also be appreciated that the parking switch can be adapted to have the brush move free of one of the conductive segments at both extremes of its travel so that the wiper may park on either side of its path if desired.

It will be obvious that the printed circuit for the mechanism can be modified in various respects in accordance with the present invention. FIG. 10 is a schematic illustration showing an alternative form for the parking switch used in the circuit of the motor. In this circuit the parking switch, generally designated 110, is shown having an insulating board with an arcuate conductive segment 112, printed, plated, etched or pressure-bonded thereon in a conventional manner. The parking switch is provided by conductive segment 112 and brush 114 which would be attached to a brush holder which biases the brush against the board in the same manner as described in regard to the brush and brush holder of FIG. 5. Conductive segment 112 is connected to one contact 116 of single pole double throw switch 118 and brush 114 is connected to junction terminal 120 between contact 122 of switch 118 and series winding 124 of a compound wound direct current motor used to drive the windshield wiper mechanism. The compound wound motor has series winding 124 connected to armature 126 and winding 128 connected in parallel with the armature. The circuit arrangement is such that the manual switch, when pole 118a engages contact 122, connects the motor directly to a source of power 130. In this position of the manual switch, the parking switch does not affect the operation of the motor. When pole 118a of the manual switch is moved to the park position engaging contact 116, a circuit is completed from the source of power through conductive segment 112 and brush 114 to the motor. The motor will continue to operate until such time as brush 114 has moved free of the arcuate conductive segment 112 at one of the extremes of travel of the brush, thus parking the wiper.

In accordance with the present invention, a further novel parking switch arrangement is provided for dynamically braking the motor used to drive the windshield wiper mechanism. A schematic illustration of the parking switch and circuit for the system is shown in FIG. 11. In order to accomplish dynamic braking of the motor, it is necessary to have the motor act as a generator across a low resistance load. In this circuit, the wiper motor is shown having permanent magnets 140 and 142 which provide the magnetic field for motor armature 144. A parking switch generally designated 146 in this embodiment of the invention is shown including an insulating board 150 having a printed circuit thereon comprising a first conductive segment 152, a second conductive segment 154 spaced from conductive segment 152 but parallel thereto, and a third conductive segment 156 spaced from conductive segments 152 and 154 but parallel thereto. The parking switch 146 includes a brush 158 which is arranged to move against the printed circuit board by being biased to that position by a brush holder supported at the pivotal connection of the link and crank, in the same manner as described in regard to FIG. 5.

As shown in FIG. 11, conductive segment 152 is generally arcuate in form and second conductive segment is arcuate in form but shorter in length than first conductive segment 152 so that brush 158 bridges between conductive segments 152 and 154 over a portion of its arcuate path of travel. Conductive segment 156 is generally arcuate in form with outwardly extending loops at its ends which extend adjacent the first conductive segment 152 at its ends so that, when brush 158 moves free of second conductive segment 154, the brush will move in its arcuate path of travel to bridge and complete a circuit between conductive segments 152 and 156, as shown in FIG. 11. The conductive segments are arranged in the circuit such that conductive segments 152 is connected to junction point 160 between armature 144 and one contact 162 of a double pole double throw manual switch 164, which has mechanically ganged poles 166 and 168. Conductive segment 154 is electrically connected to contact 170 of the switch providing the other contact for pole 166 of the manual switch. Third conductive segment 156 is electrically connected to contact 172 for pole 168, the other contact for pole 168 not being used. Pole 166 of manual switch 164 is electrically connected to a source of power 174 for energizing the motor and pole 168 of the switch is connected to electrical ground.

The circuit arrangement is such that when the manual switch is in the run position, as shown by the alternative position of the poles in FIG. 11, pole 166 will engage contact 162 to connect the armature of the motor directly to the source of power 174, thereby energizing the motor to operate the windshield wiper mechanism. In this position of the manual switch, the parking switch plays no part in the operation of the mechanism and the motor operates continuously. However, when the manual switch is moved to the "park" position, pole 166 will engage contact 170 and pole 168 will engage contact 172. In this arrangement of the circuit, the source of power 174 is connected to the second conductive segment 154. If the brush is, at that instant, bridged between first conductive segment 152 and second conductive segment 154, as shown by the solid line position 158 of the brush in FIG. 11, a circuit between the first and second conductive segments is completed to connect the source of power to the armature of the motor. Hence, the motor will continue to operate until such time as brush 158 is moved free of second conductive segment 154 at one of the extremes of travel of the brush, as shown by the dotted line position 176 of the brush in FIG. 11. Due to the inertia of the motor armature, the armature will coast, thereby moving the link and crank to cause the brush to continue to move toward position 178 of the brush shown in dotted lines in FIG. 11. This distance of travel of the brush would represent only a few revolutions of the motor armature. In position 178 of the brush, a circuit is completed from conductive segment 152 through the brush to conductive segment 156 thereby connecting the armature through contact 172 and pole 168 to electrical ground. The other connection to the armature remote from junction terminal 160 is, of course, always to electrical ground. Due to the magnetic field provided by the permanent magnets 140 and 142, a voltage is generated in the armature as it coasts within the magnetic field. With a circuit completed through the armature to electrical ground, the resulting load from the generator action of the rotating armature provides a braking force on the armature, thus providing a sudden and positive stopping of the armature. The positive stopping of the armature causes the windshield wiper to park at this position in its travel.

In the parking switch arrangement of FIG. 11, if the brush moves to position 178 at one extremity of its travel, it is preferable to have the brush remain in contact with conductive segment 154 at its other extreme of travel, so that the wiper may be parked at the same extreme of its travel each time it is parked. If it is desired to park the wiper at its opposite extreme of travel, the printed circuit board 150 could be rotated by the tab of the washer to a new position in the same manner as described in regard to FIG. 3.

It should be observed that the first, second and third conductive segments may be formed and connected in the circuit in different arrangements. For example, the first conductive segment may be made shorter in length than the second conductive segment so that the brush moves free of the first conductive segment at one extreme of its travel to complete a circuit between the second and third conductive segments. In this arrangement, the first conductive segment would be connected to contact 170 and the first conductive segment would be connected to contact 162 to provide the dynamic braking feature in accordance with the present invention.

It will be obvious to those skilled in the art that the parking switch of the present invention employing printed circuit conductive segments and a brush to complete the circuit provide advantages over the prior art. The parking switch of the present invention is much more inexpensively manufactured and assembled, and is more suitable for easy automated production. The present invention does not require assembly of stamped conductive elements or a number of brushes to complete complex circuit arrangements, as generally shown in the prior art. Moreover, the present invention, using dynamic braking of the armature, automatically provides positive stopping of the wiper at any desired park position.

Other modifications of the windshield wiper mechanism and its system described herein will occur to those skilled in the art. All such modifications are intended to be within the scope and spirit of the present invention as defined by the appended claims.

I claim:

1. A windshield wiper mechanism, which comprises: an electric motor; a rotatable member coupled to the motor and driven thereby; an oscillating crank for driving a windshield wiper back and forth through an arc; an actuating link for translating the rotation of the rotatable member into the oscillatory movement of the crank, the link being pivotally connected at one end to the crank and at its other end to the rotatable member at a radius from the axis of rotation thereof; an actuator member supported adjacent the pivotal connection of the link and the crank; a parking switch including a printed circuit board having a printed circuit thereon, the printed circuit including at least one conductive segment; a conductive member connected to the actuator member and adapted to move with the actuator member in contact with the conductive segment over a portion of the path of the actuator member to complete a circuit between the conductive segment and the conductive member; and a manual switch for connecting the motor alternatively directly to a source of power or to the source of power through the circiut between the conductive segment and conductive member so that when the conductive member moves free of the conductive segment the motor will be deenergized.

2. A windshield wiper mechanism, which comprises: an electric motor; a rotatable member coupled to the motor and driven thereby; an oscillating crank for driving a windshield wiper back and forth through an arc; an actuating link for translating the rotation of the rotatable member into the oscillatory movement of the crank, the link being pivotally connected at one end to the crank and at its other end to the rotatable member at a radius from the axis of rotation thereof; an actuator member supported adjacent the pivotal connection of the link and crank; a parking switch including a printed circuit board having a printed circuit thereon, said printed circuit including a first conductive segment and a second conductive segment spaced from the first conductive segment; a conductive member connected to the actuator member and adapted to move with the actuator member in contact with each of the conductive segments over a portion of the path of the actuator member to complete a circuit between the conductive segments; and a manual switch for connecting the motor alternatively directly to a source of power or to the source of power through the circuit of the parking switch so that when the conductive member moves free of one of the conductive segments the motor will be deenergized.

3. The windshield wiper mechanism of claim 2 in which the conductive segments are arcuate in form, the conductive member is provided by a brush, and the actuator member moves the brush in an arcuate path to be free of one of the conductive segments at one extreme of the path for parking the windshield wiper at the one extreme of its path.

4. The windshield wiper mechanism of claim 2 in which the motor includes an armature rotating in a magnetic field provided by a permanent magnet; the printed circuit further includes a third conductive segment spaced from the first and second conductive segments and arranged to be contacted by the conductive member when the conductive member has moved free of the second conductive segment so that another circuit is completed by the conductive member between the first and third conductive segments; and the manual switch comprises a double pole double throw switch for connecting the armature of the motor alternatively directly to the source of power or to the source of power through the circuit of the parking switch so that when the conductive member contacts the first and second conductive segments the armature will be connected to the source of power through the circuit between the first and second conductive segments and when the conductive member moves free of the second conductive segment and in contact with the first and third conductive segments the armature will be connected through the circuit between the first and third conductive segments to electrical ground thereby providing dynamic braking of the armature rotating within the magnetic field.

5. The windshield wiper mechanism of claim 4 wherein the first and second conductive segments are arcuate in form, the conductive member is provided by a brush which is moved by the actuator member to be free of the second conductive member at one extreme of its path and in contact with the first and third conductive segments at the one extreme of its path.

6. The windshield wiper mechanism of claim 4 in which the parking switch is adjustable in position relative to the actuator member to change the park position of the windshield wiper.

7. A windshield wiper mechanism, which comprises: drive means adapted to be coupled to a motor and adapted to drive a windshield wiper back and forth through an arc and including an actuator member movable in a predetermined path; a parking switch including a printed circuit board having a printed circuit thereon, the printed circuit including at least one conductive segment, a conductive member connected to the actuator member and adapted to move with the actuator member in contact with the conductive segment over a portion of the path of the actuator member to complete a circuit between the conductive segment and the conductive member; and manual switch means for connecting the motor alternatively directly to a source of power or to the source of power through the circuit between the conductive segment and conductive member so that when the conductive member moves free of the conductive segment the motor will be deenergized.

8. A windshield wiper mechanism, which comprises: an electric motor drive means coupled to the motor and adapted to drive a windshield wiper back and forth through an arc and including an actuator member movable in a predetermined path; a parking switch including a printed circuit board having a printed circuit thereon, said printed circuit including a first conductive segment and a second conductive segment spaced from the first conductive segment, a conductive member connected to the actuator member and adapted to move with the actuator member in contact with each of the conductive segments over a portion of the path of the actuator member to complete a circuit between the conductive segments; and manual switch means for connecting the motor alternatively directly to a source of power or to the source of power through the circuit of the parking switch so that when the conductive member moves free of one of the conductive segments the motor will be deenergized.

9. The windshield wiper mechanism of claim 8 in which the conductive segments are arcuate in form, the conductive member is provided by a brush, and the actuator member moves the brush in an arcuate path to be free of one of the conductive segments at one extreme of the path for parking the windshield wiper at the one extreme of its path.

10. The windshield wiper mechanism of claim 8 in which the motor includes an armature rotating in a magnetic field provided by a permanent magnet; the printed circuit further includes a third conductive segment spaced from the first and second conductive segments and arranged to be contacted by the conductive member when the conductive member has moved free of the second conductive segment so that another circuit is completed by the conductive member between the first and third conductive segments; and the manual switch means comprises a double pole double throw switch for connecting the armature of the motor alternatively directly to the source of power or to the source of power through the circuit of the parking switch so that when the conductive member contacts the first and second conductive segments the armature will be connected to the source of power through the circuit between the first and second conductive segments and when the conductive member moves free of the second conductive segment and in contact with the first and third conductive segments the armature will be connected through the circuit between the first and third conductive segments to electrical ground thereby providing dynamic braking of the armature rotating within the magnetic field.

11. The windshield wiper mechanism of claim 10 in which the first and second conductive segments are arcuate in form, the conductive member is provided by a brush which is moved by the actuator member to be free of the second conductive member at one extreme of its path and in contact with the first and third conductive segments at the one extreme of its path.

12. A windshield wiper mechanism, which comprises: an electric motor; a rotatable member coupled to the motor and driven thereby; drive means coupled to the rotatable member and adapted to be coupled to a windshield wiper for translating the rotation of the rotatable member into movement for driving the windshield wiper back and forth through an arc; the drive means including an actuator member movable in a predetermined path; a parking switch including a printed circuit board having a printed circuit thereon, the printed circuit including at least one conductive segment, a conductive member connected to the actuator member and adapted to move with the actuator member in contact with the conductive segment over a portion of the path of the actuator member to complete a circuit between the conductive segment and the conductive member; and manual switch means for connecting the motor alternatively directly to a source of power or to the source of power through the circuit between the conductive segment and conductive member so that when the conductive member moves free of the conductive segment the motor will be deenergized.

13. A windshield wiper mechanism, which comprises: an electric motor; a rotatable member coupled to the motor and driven thereby; drive means coupled to the rotatable member and adapted to be coupled to a windshield wiper for translating the rotation of the rotatable member into movement for driving the windshield wiper back and forth through an arc; the drive means including an actuator member movable in a predetermined path; a parking switch including a printed circuit board having a printed circuit thereon, said printed circuit including a first conductive segment and a second conductive segment spaced from the first conductive segment, a conductive member connected to the actuator member and adapted to move with the actuator member in contact with each of the conductive segments over a portion of the path of the actuator member to complete a circuit between the conductive segments; and manual switch means for connecting the motor alternatively directly to a source of power or to the source of power through the circuit of the parking switch so that when the conductive member moves free of one of the conductive segments the motor will be deenergized.

14. The windshield wiper mechanism of claim 13 in which the conductive segments are arcuate in form, the conductive member is provided by a brush, and the actuator member moves the brush in an arcuate path to be free of one of the conductive segments at one extreme of the path for parking the windshield wiper at the one extreme of its path.

15. The windshield wiper mechanism of claim 13 in which the motor includes an armature rotating in a magnetic field provided by a permanent magnet; the printed circuit further includes a third conductive segment spaced from the first and second conductive segments and arranged to be contacted by the conductive member when the conductive member has moved free of the second conductive segment so that another circuit is completed by the conductive member between the first and third conductive segments; and the manual switch means comprises a double pole double throw switch for connecting the armature of the motor alternatively directly to the source of power or to the source of power through the circuit of the parking switch so that when the conductive member contacts the first and second conductive segments the armature will be connected to the source of power through the circuit between the first and second conductive segments and when the conductive member moves free of the second conductive segment and in contact with the first and third conductive segments the armature will be connected through the circuit between the first and third conductive segments to electrical ground thereby providing dynamic braking of the armature rotating within the magnetic field.

16. The windshield wiper mechanism of claim 15 wherein the first and second conductive segments are arcuate in form, the conductive member is provided by a brush which is moved by the actuator member to be free of the second conductive member at one extreme of its path and in contact with the first and third conductive segments at the one extreme of its path.

17. The windshield wiper mechanism of claim 15 in which the parking switch is adjustable in position relative to the actuator member to change the park position of the windshield wiper.

References Cited

UNITED STATES PATENTS

| | | | |
|---|---|---|---|
| 2,934,965 | 5/1960 | Perry | 15—250.17 |
| 3,090,068 | 5/1963 | Brooks | 15—250.17 |
| 3,242,520 | 3/1966 | Carroll et al. | 15—250.17 |
| 3,253,206 | 5/1966 | Romanowski | 15—250.17 XR |

CHARLES A. WILLMUTH, *Primary Examiner.*

ROBERT I. SMITH, *Assistant Examiner.*